(12) United States Patent
Leonardi et al.

(10) Patent No.: US 6,750,626 B2
(45) Date of Patent: Jun. 15, 2004

(54) DIAGNOSTIC STRATEGY FOR AN ELECTRIC MOTOR USING SENSORLESS CONTROL AND A POSITION SENSOR

(75) Inventors: Franco Leonardi, Dearborn Heights, MI (US); Henry Heping Huang, Canton, MI (US); John Michael Miller, Cedar, MI (US); Michael W. Degner, Novi, MI (US)

(73) Assignee: Ford Global Technologies, LLC, Dearborn, MI (US)

( * ) Notice: Subject to any disclaimer, the term of this patent is extended or adjusted under 35 U.S.C. 154(b) by 0 days.

(21) Appl. No.: 10/065,026

(22) Filed: Sep. 11, 2002

(65) Prior Publication Data

US 2004/0046519 A1 Mar. 11, 2004

(51) Int. Cl.[7] ............................................. G05B 11/28
(52) U.S. Cl. .................. 318/602; 318/668; 318/432; 318/434; 324/207.11; 324/207.12; 324/207.14; 324/207.23
(58) Field of Search ................................ 318/602, 603, 318/652, 653, 668, 721, 799, 432, 434; 324/207.11, 207.12, 207.14, 207.23

(56) References Cited

U.S. PATENT DOCUMENTS

| | | | | |
|---|---|---|---|---|
| 3,909,688 A | * | 9/1975 | Blaschke et al. ............ | 318/700 |
| 4,575,666 A | * | 3/1986 | Nakashima et al. ......... | 318/661 |
| 4,827,203 A | * | 5/1989 | Sakano ........................ | 318/661 |
| 5,343,970 A | | 9/1994 | Severinsky | |
| 5,376,869 A | | 12/1994 | Konrad | |
| 5,461,293 A | * | 10/1995 | Rozman et al. ............. | 318/603 |
| 5,532,671 A | | 7/1996 | Bachman et al. | |
| 5,637,974 A | * | 6/1997 | McCann ...................... | 318/701 |
| 5,811,957 A | | 9/1998 | Bose et al. | |
| 5,920,175 A | | 7/1999 | Jones et al. | |
| 5,999,946 A | | 12/1999 | Bailis et al. | |
| 6,073,713 A | | 6/2000 | Brandenburg et al. | |
| 6,104,113 A | | 8/2000 | Beifus | |
| 6,137,258 A | | 10/2000 | Jansen | |
| 6,163,119 A | | 12/2000 | Jeong | |
| 6,163,127 A | * | 12/2000 | Patel et al. .................. | 318/700 |
| 6,321,144 B1 | | 11/2001 | Crombez | |
| 6,564,110 B1 | * | 5/2003 | Makino et al. ............... | 700/56 |

OTHER PUBLICATIONS

Degner, Michael W. and Lorenz, Robert D., "Position Estimation in Induction Machines Utilizing Rotor Bar Slot Harmonics–and–Carrier–Frequency Signal Injection," IEEE Transactions on Industry Applications, vol. 36, No. 3, May/Jun. 2000.

* cited by examiner

*Primary Examiner*—Rina Duda
(74) *Attorney, Agent, or Firm*—Brooks Kushman P.C.; Carlos L. Hanze

(57) ABSTRACT

A strategy to control and diagnose the operation of an electric motor using a sensorless control system augmented by feedback from a position and speed sensor is disclosed. The strategy can improve the robustness of operation and diagnose potential faults in electric motors. The present invention includes a method for diagnosing operation of an electric motor and a method and system for controlling an electric motor. In the diagnostic method, a sensorless system and a sensor based system are checked against each other to determine if either of the systems is faulted. In the control method, the sensor based control system is used when the motor speed is below a predetermined threshold and the sensorless system is used when the motor speed is above the predetermined threshold. The position sensor can be a low resolution position sensor, an engine crankshaft sensor, an engine camshaft sensor, or a transmission sensor.

3 Claims, 2 Drawing Sheets

DIAGNOSTIC STRATEGY FOR AN ELECTRIC MOTOR USING SENSORLESS CONTROL AND A POSITION SENSOR

FIELD OF INVENTION

The present invention relates generally to an electrically powered vehicle, such as an electric vehicle (EV), a hybrid electric vehicle (HEV) or a fuel cell vehicle (FCV). More specifically the invention relates to a strategy to diagnose a potential fault in an electric motor. The present invention can improve the robustness of operation and diagnose potential faults in electric motors by utilizing a sensorless control scheme augmented by feedback from a low-resolution position and speed sensor.

BACKGROUND OF INVENTION

The need to reduce fossil fuel consumption and emissions in automobiles and other vehicles predominately powered by internal combustion engines (ICEs) is well known. Vehicles powered by electric motors attempt to address these needs. Another alternative solution is to combine a smaller ICE with electric motors into one vehicle. Such vehicles combine the advantages of an ICE vehicle and an electric vehicle and are typically called hybrid electric vehicles (HEVs). See generally, U.S. Pat. No. 5,343,970 to Severinsky.

The HEV is described in a variety of configurations. Many HEV patents disclose systems where an operator is required to select between electric and internal combustion operation. In other configurations, the electric motor drives one set of wheels and the ICE drives a different set.

Other, more useful, configurations have developed. For example, a series hybrid electric vehicle (SHEV) configuration is a vehicle with an engine (most typically an ICE) connected to an electric motor called a generator. The generator, in turn, provides electricity to a battery and another motor, called a traction motor. In the SHEV, the traction motor is the sole source of wheel torque. There is no mechanical connection between the engine and the drive wheels. A parallel hybrid electrical vehicle (PHEV) configuration has an engine (most typically an ICE) and an electric motor that work together in varying degrees to provide the necessary wheel torque to drive the vehicle. Additionally, in the PHEV configuration, the motor can be used as a generator to charge the battery from the power produced by the ICE.

A parallel/series hybrid electric vehicle (PSHEV) has characteristics of both PHEV and SHEV configurations and is sometimes referred to as a parallel/series "split" configuration. In one of several types of PSHEV configurations, the ICE is mechanically coupled to two electric motors in a planetary gear-set transaxle. A first electric motor, the generator, is connected to a sun gear. The ICE is connected to a carrier gear. A second electric motor, a traction motor, is connected to a ring (output) gear via additional gearing in a transaxle. Engine torque can power the generator to charge the battery. The generator can also contribute to the necessary wheel (output shaft) torque if the system has a one-way clutch. The traction motor is used to contribute wheel torque and to recover braking energy to charge the battery. In this configuration, the generator can selectively provide a reaction torque that may be used to control engine speed. In fact, the engine, generator motor and traction motor can provide a continuous variable transmission (CVT) effect. Further, the HEV presents an opportunity to better control engine idle speed over conventional vehicles by using the generator to control engine speed.

The desirability of combining an ICE with electric motors is clear. There is great potential for reducing vehicle fuel consumption and emissions with no appreciable loss of vehicle performance or driveability. The HEV allows the use of smaller engines, regenerative braking, electric boost, and even operating the vehicle with the engine shut down. Nevertheless, new ways must be developed to optimize the HEV's potential benefits.

One such area of development is diagnosing potential faults in an electric motor and increasing the robustness of the operation of an electric motor. An effective and successful HEV design (or any vehicle propelled by electric motors) requires reliable operation. Reliable operation can be improved through careful diagnosis of potential faults within the electric motor and increasing the robustness of electric motor operation. Thus there is a need for a strategy to effectively diagnose potential faults in an electric motor propelled vehicle's electrical motor and increase the robustness of electric motor operation. One strategy to improve the robustness of operation and diagnose potential faults in electric motors is to utilize a sensorless control scheme coupled with feedback from a low-resolution position and speed sensor.

Sensorless control schemes for electric machines (also referred to as electric motors or generators) are known in the art. Electric machines can be induction, synchronous or switched reluctance type. For example, U.S. Pat. No. 6,137,258 to Jansen describes a system for speed-sensorless control of an induction machine (electric motor) that includes a flux regulator and torque current calculator for operating the machine in a saturated state. U.S. Pat. No. 6,163,119 to Jeong describes a sensorless speed control method for a high speed motor that utilizes a reverse electromotive force. U.S. Pat. No. 5,920,175 to Jones et al. describes a sensorless control system for operating an inverter coupled to a switched reluctance machine that includes an instantaneous position generation circuit that develops a signal for controlling commutation of the switched reluctance machine. See also, U.S. Pat. No. 5,811,957 to Bose et al., and U.S. Pat. No. 6,104,113 to Beifus.

Low resolution shaft position and speed sensors are also known in the art and are commonly installed in automotive vehicles. Crankshaft position and speed sensors, camshaft position and speed sensors and transmission position and speed sensors are examples of low resolution shaft position sensors used in automotive vehicles.

However, sensorless control schemes for electric motors and low resolution position and speed sensors each have their drawbacks and limitations. Sensorless control schemes often fail at low shaft rotational speeds and thus often limited to high shaft rotational speeds. Low resolution shaft position and speed sensors can measure shaft position and speed at low shaft rotational speeds, but have limited accuracy.

SUMMARY OF INVENTION

Accordingly, the present invention provides a strategy to control an electric motor using a sensorless control scheme augmented by feedback from a low-resolution position and speed sensor. The strategy can improve the robustness of operation and diagnose potential faults in electric motors.

In accordance with an important aspect of the invention, two different control systems are utilized in order to optimize motor performance. A low resolution position and speed sensor is used at low motor speeds while a sensorless control system is used at higher motor speeds, i.e., those which exceed a preselected threshold. In accordance with a related aspect, the invention provides a method for diagnosing operation of an electric motor utilizing two such different control systems.

In accordance with a further aspect of the invention, an apparent shaft position of a motor based on data provided by one of the different control systems can be corrected using data provided by the other of said control systems.

In accordance with yet further aspects of the invention, control systems and automotive vehicles embodying the two different control systems are provided.

The present invention includes a method for diagnosing operation of an electric motor that comprises the steps of: determining a first shaft position using a sensorless control system; determining a second shaft position using a position sensor; and evaluating operation of the electric motor based at least in part on data output related to the first shaft position and to the second shaft position. The diagnostic method can also include evaluating operation of the sensorless control scheme based on the second shaft position, as well as evaluating operation of the position sensor based on the first shaft position, and determining a modified shaft position based on the first shaft position and the second shaft position.

The present invention also includes a method for controlling an electric motor that comprises the steps of: determining an electric motor rotational speed; operating the electric motor using a sensorless control system if the electric motor rotational speed is above a predetermined threshold; and operating the electric motor using a sensor based control system if the electric motor rotational speed is below the predetermined threshold. The control method can also include correcting the sensorless control system using data output from the sensor based control system and correcting the sensor based control system using data output from the sensorless control system.

Operating the electric motor using the sensorless control system if the electric motor rotational speed is above a predetermined threshold can include, alternatively, the steps of: determining motor speed and position from a plurality of phase current and phase voltage signals; determining an inverter voltage command from the motor speed and position; determining the plurality of phase current and phase voltage signals from the inverter voltage command; determining motor speed and position from a position sensor; and correcting the phase current and phase voltage signal determined motor speed and position with the position sensor determined motor speed and position.

Operating the electric motor using a sensor based control system if the electric motor rotational speed is below the predetermined threshold step can be based on: determining motor speed and position from a position sensor; determining an inverter voltage command from the motor speed and position; determining a plurality of phase current and phase voltage signals from the inverter voltage command; and determining motor speed and position from a plurality of phase current and phase voltage signals and correcting the position sensor determined motor speed and position with the phase current and phase voltage signal determined motor speed and position data.

The present invention also includes a system to control an electric motor comprising: an inverter operatively connected to the motor; a position estimator operatively connected to the motor and the inverter; a torque controller operatively connected to the position estimator and the inverter; a position sensor operatively connected to the motor and the position estimator; means for determining a first electric motor shaft position based on an output from the inverter; means for determining a second electric motor shaft position based on an output from the position sensor; and means for correcting the first electric motor shaft position using data about the second electric motor shaft position. The control system can also include means for correcting the second electric motor shaft position using data related to the first electric motor shaft position. The position sensor can be a low resolution position sensor, an engine crank shaft position sensor, an engine camshaft position sensor, or a transmission sensor.

Other objects of the present invention will become more apparent to persons having ordinary skill in the art to which the present invention pertains from the following description taken in conjunction with the accompanying figures.

BRIEF DESCRIPTION OF DRAWINGS

The foregoing objects, advantages, and features, as well as other objects and advantages, will become apparent with reference to the description and figures below, in which like numerals represent like elements and in which.

DETAILED DESCRIPTION

Figure 1:
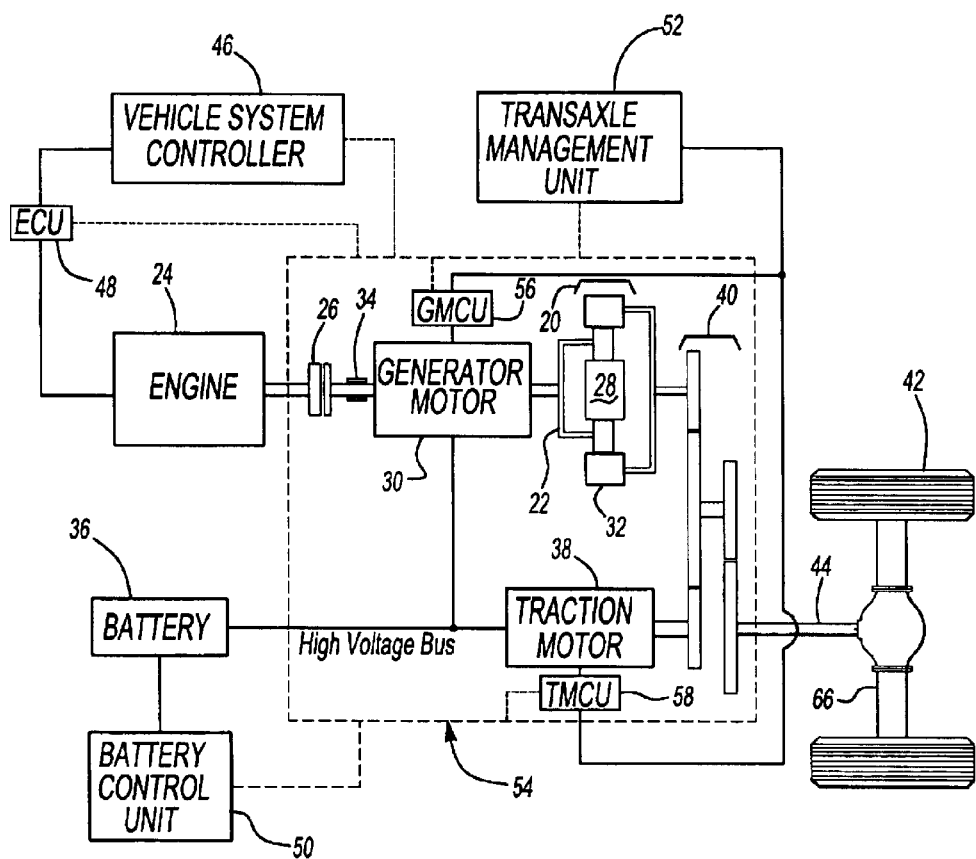
FIG. 1 illustrates a general hybrid electric vehicle (HEV) configuration.

The present invention relates to electric motors. As the use of electric motors in vehicle applications increases, robust motor operation and diagnosing potential faults is increasingly more important. This is especially true in the harsh conditions typically experienced by motors used as vehicle components. For demonstration purposes and to assist in understanding the present invention, it is described in a hybrid electric vehicle (HEV) application. FIG. 1 demonstrates just one possible HEV configuration, specifically a parallel/series hybrid electric vehicle (powersplit) configuration.

In a basic HEV, a planetary gear set 20 mechanically couples a carrier gear 22 to an engine 24 via a one-way clutch 26. The planetary gear set 20 also mechanically couples a sun gear 28 to a generator motor 30 and a ring (output) gear 32. The generator motor 30 also mechanically links to a generator brake 34 and is electrically linked to a battery 36. A traction motor 38 is mechanically coupled to the ring gear 32 of the planetary gear set 20 via a second gear set 40 and is electrically linked to the battery 36. The ring gear 32 of the planetary gear set 20 and the traction motor 38 are mechanically coupled to drive wheels 42 via an output shaft 44.

The planetary gear set 20, splits the engine 24 output energy into a series path from the engine 24 to the generator motor 30 and a parallel path from the engine 24 to the drive wheels 42. Engine 24 speed can be controlled by varying the split to the series path while maintaining the mechanical connection through the parallel path. The traction motor 38 augments the engine 24 power to the drive wheels 42 on the parallel path through the second gear set 40. The traction motor 38 also provides the opportunity to use energy directly from the series path, essentially running off power created by the generator motor 30. This reduces losses associated with converting energy into and out of chemical energy in the battery 36 and allows all engine 24 energy, minus conversion losses, to reach the drive wheels 42.

A vehicle system controller (VSC) 46 controls many components in this HEV configuration by connecting to each component's controller. An engine control unit (ECU) 48 connects to the engine 24 via a hardwire interface. All vehicle controllers can be physically combined in any combination or can stand as separate units. They are described as separate units here because they each have distinct functionality. The VSC 46 communicates with the ECU 48, as well as a battery control unit (BCU) 50 and a transaxle management unit (TMU) 52 through a communication network such as a controller area network (CAN) 54. The BCU 50 connects to the battery 36 via a hardwire interface.

The TMU 52 controls the generator motor 30 and traction motor 38 via a hardwire interface to a generator motor control unit (GMCU) 56 and a traction motor control unit (TMCU) 58. The control units 46, 48, 50, 52, 56, and 58 and CAN 54 can include one or more microprocessors, computers, or central processing units; one or more computer readable storage devices; one or more memory management units; and one or more input/output devices for communicating with various sensors, actuators and control circuits.

The present invention is a strategy to control an electric motor using a sensorless control scheme augmented by feedback from a low-resolution position and speed sensor. This invention can be in a computer readable format embodied in one or more of the computing devices described above.

Figure 2:
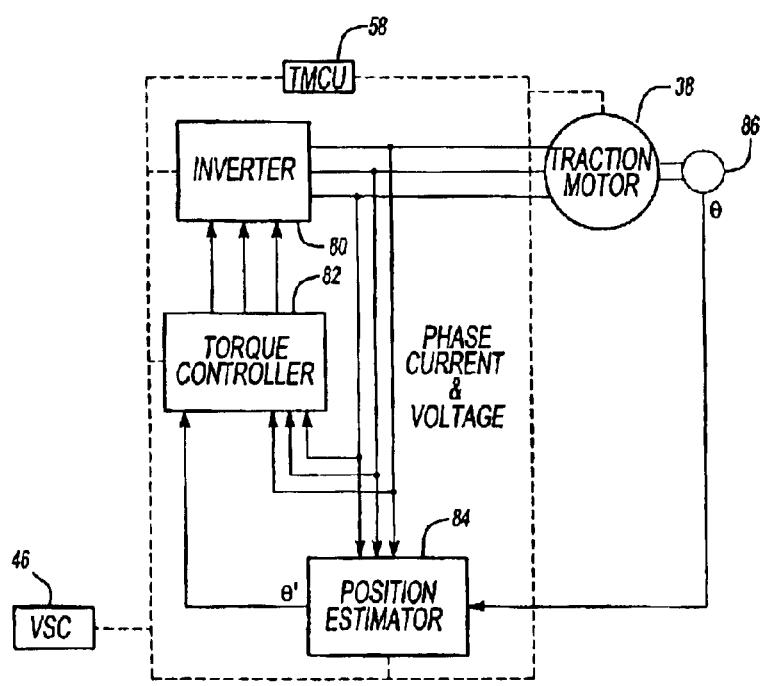
FIG. 2 illustrates a sensorless control scheme for an electric motor augmented by feedback from a low resolution position and speed sensor.

FIG. 2 illustrates a sensorless control scheme for an electric motor augmented by feedback from a low resolution position and speed sensor. The TMCU 58 is shown and is communicatively connected to an inverter 80, a torque controller 82 and a position estimator 84. Inverters, known in the art, change direct current into alternating current having the appropriate number of phases. Inverter 80 is shown as a three-phase inverter. The current and voltage signals of the three phases are used to drive the traction motor 38. The current and voltage signals of the three phases are also input into the torque controller 82 and the position estimator 84.

Connected to the traction motor 38 is a low resolution position/speed sensor 86. Low resolution shaft position and speed sensors, known in the art, can include crankshaft position and speed sensors, camshaft position and speed sensors and transmission position and speed sensors.

The low resolution position/speed sensor 86 outputs a shaft position signal, $\theta$, which is an input to the position estimator 84. The position estimator 84 also receives the signals from the inverter 80. The position estimator 84 outputs a modified shaft position signal, $\theta'$. The modified shaft position signal is input into the torque controller 82. The torque controller 82 output voltage commands back to the inverter 80.

As shown, the modified shaft position signal, $\theta'$, is an output of the position estimator 84. $\theta'$ can be the position data from the low resolution position/speed sensor 86. $\theta'$ can also be based on phase current and/or voltage using methods known in the art for sensorless control. Furthermore, $\theta'$ can be estimated position after correction using the low-resolution position/speed sensor 86 input, through feedback control or other means known in the art for signal correction.

For the present invention, sensorless control is the primary control strategy at non-zero traction motor 38 speeds, e.g. speeds greater than about 10 to about 100 RPM. Typically 50 RPM is a preferred threshold engine speed. This threshold is selected based on the electric motor and the accuracy of the sensorless control system. This threshold can vary based on the particular application. The sensorless control estimates position data based on mathematical calculations, such as the back-emf, flux linkage or other means known in the art.

The present invention can also use the low resolution position/speed sensor 86 to revise or correct the sensorless control estimate to provide a more accurate measurement of rotor position or velocity. This gives the present invention an ability to compensate for possible estimation errors caused by measurement noise, faults, machine parameter variations, and to compensate for mechanical transients that are beyond the bandwidth of the sensorless control algorithm.

At zero or very low speed, e.g. speeds less than about 50 RPM, sensor-based control is the primary control method using the low resolution position/speed sensor 86, with the sensorless control estimate as a possible backup in the event of a system fault or for use in refining the measured signal. To avoid adding additional complexity and/or cost to the system, the low resolution position/speed sensor 86 can be one of the low resolution position/speed sensors already present in the powertrain, such-as an engine crank shaft position sensor, engine camshaft position sensor, or transmission sensor.

The present invention combines the advantages of sensorless control and sensor-based control to improve reliability and increase operating robustness without significantly increasing system cost. The invention can also diagnose potential faults in the electric motor without the need for redundant sensors. For example, in the event of a fault in the low resolution position/speed sensor 86, the sensorless control system could function independently. Alternatively, in the event of a fault in the sensorless control system, the low resolution position/speed sensor 86 could function independently.

The above-described embodiments of the invention are provided purely for purposes of example. Many other variations, modifications, and applications of the invention may be made.

What is claimed is:

1. A method for diagnosing operation of an electric motor, comprising:

determining a first shaft position using a sensorless control system;

determining a second shaft position using a position sensor; and evaluating operation of said electric motor based at least in part on a comparison of said first shaft position to said second shaft position;

transmitting a modified shaft position to a torque controller from a position estimator based on said evaluation of said electric motor;

transmitting a voltage command from said torque controller to an inverter based at least in part on said modified shaft position unless the evaluation indicates inoperability of said position estimator, said torque controller calculating and transmitting said voltage command based on using the sensorless control system during inoperability of said position estimator.

2. The method according to claim 1, further comprising evaluating operation of said sensorless control scheme based on said second shaft position.

3. The method according to claim 1, further comprising evaluating operation of said position sensor based on said first shaft position.

* * * * *